(12) United States Patent
Kai (10) Patent No.: US 11,152,842 B2
(45) Date of Patent: Oct. 19, 2021

(54) ELECTROMAGNETIC MOTOR AND GENERATOR

(71) Applicant: Win Kai, Spokane, WA (US)

(72) Inventor: Win Kai, Spokane, WA (US)

( * ) Notice: Subject to any disclaimer, the term of this patent is extended or adjusted under 35 U.S.C. 154(b) by 39 days.

(21) Appl. No.: 16/440,418

(22) Filed: Jun. 13, 2019

(65) Prior Publication Data

US 2020/0395833 A1 Dec. 17, 2020

(51) Int. Cl.
*H02K 21/24* (2006.01)

(52) U.S. Cl.
CPC .................................. *H02K 21/24* (2013.01)

(58) Field of Classification Search
CPC ............................... H02K 21/24; H02K 21/12
USPC ..................................................... 310/156.37
See application file for complete search history.

(56) References Cited

U.S. PATENT DOCUMENTS

| | | | | |
|---|---|---|---|---|
| 242,931 | A | | 6/1881 | Hussey |
| 2,077,981 | A | | 4/1937 | Bergen |
| 3,304,598 | A | | 2/1967 | Henry-Baudot |
| 4,814,654 | A | | 3/1989 | Gerfast |
| 5,179,307 | A | * | 1/1993 | Porter ................... H02K 29/10 310/156.32 |
| 5,514,923 | A | * | 5/1996 | Gossler ..................... H02P 6/14 310/74 |
| 5,982,058 | A | | 11/1999 | Bustamante et al. |
| 7,105,972 | B2 | * | 9/2006 | Gallant ..................... H02K 7/02 180/65.1 |
| 7,535,145 | B2 | * | 5/2009 | Murakami ........... H02K 1/2793 310/156.08 |
| 8,497,612 | B2 | | 7/2013 | Minowa et al. |
| 9,608,484 | B2 | * | 3/2017 | Cho ..................... H02K 1/2793 |
| 2003/0025417 | A1 | * | 2/2003 | Rose ....................... H02K 21/12 310/180 |
| 2005/0127767 | A1 | * | 6/2005 | Gallant .................... H02K 7/14 310/113 |
| 2006/0087194 | A1 | * | 4/2006 | Kataoka ................. H02K 21/24 310/207 |
| 2007/0222331 | A1 | * | 9/2007 | Horng ................... F04D 27/004 310/268 |
| 2009/0295254 | A1 | * | 12/2009 | Horng ................ H02K 11/0141 310/256 |
| 2014/0368095 | A1 | * | 12/2014 | Kamibayashi ......... H02K 7/116 310/75 R |
| 2016/0308411 | A1 | * | 10/2016 | Watanabe ............... H02K 16/02 |
| 2017/0104402 | A1 | * | 4/2017 | Dai ........................ H02K 37/14 |
| 2017/0244293 | A1 | * | 8/2017 | Kanda .................... H02K 21/24 |
| 2017/0358976 | A1 | * | 12/2017 | Kelly .................... H02K 1/2793 |

(Continued)

*Primary Examiner* — Alexander Talpalatski
(74) *Attorney, Agent, or Firm* — Lee & Hayes, P.C.

(57) ABSTRACT

A motor includes a coil and a rotor plate positioned proximate to the coil. Magnets are affixed on the side of the rotor plate and arranged in a circle such that, upon rotation of the rotor plate, the magnets pass, successively, adjacent the coil. Each of the magnets is oriented in a plane that extends through each of the magnets from the north pole to the south pole thereof. The magnets include at least a first magnet, a second magnet, and a third magnet. The second magnet is adjacent the first magnet, and the third magnet is adjacent the first magnet. The north pole of the first magnet is spaced a predetermined distance from the south pole of the third magnet, and the south pole of the first magnet is spaced the predetermined distance from the north pole of the second magnet.

20 Claims, 6 Drawing Sheets

(56) References Cited

U.S. PATENT DOCUMENTS

| | | |
|---|---|---|
| 2018/0138768 A1 | 5/2018 | Kelly |
| 2018/0138793 A1* | 5/2018 | Kelly ............... H02K 16/00 |
| 2019/0058374 A1* | 2/2019 | Enomoto ............ F28D 15/02 |
| 2020/0052564 A1* | 2/2020 | Kelly ................. H02K 3/47 |

* cited by examiner

ELECTROMAGNETIC MOTOR AND GENERATOR

BACKGROUND

Two of the most basic elements of a generic conventional motor or generator are a rotor (or "rotor plate") and a stator. The stator is generally fixed in position with respect to the rotor, which is restricted to rotational movement about a central axis along which extends a shaft. The shaft delivers the rotational movement of the stator (i.e., work—the force to cause movement to a device). Though the principles discussed herein apply to both a motor and a generator, inasmuch as nearly all motors can be run as generators by doing work on the rotor to run the motor in reverse and thereby creating electric power, for the sake of convenience, the use of the term "motor" hereinafter may be understood to include a motor and a generator, unless explicitly stated otherwise.

There are many variations of conventional motors, particularly with respect to individual component types, materials used, shapes of components, etc. all used to optimize or enhance aspects of functionality. A focus of this disclosure is an electromagnetic motor. At a very basic level, an electromagnetic motor operates due to interaction between two magnetic fields—one associated with the stator and one associated with the rotor—to generate rotational force. In some motors, permanent magnets ("PMs") provide a constant magnetic field that interacts with an induced magnetic field, which is induced by winding currents sent through metal coils. In other motors, both of the magnetic fields may be induced in coils. For the sake of convenience, whether a PM or a metal coil with an induced magnetic field, unless necessary and explicitly stated, both may be referred to collectively as "magnetic field elements" or MFE(s).

Regardless of which type of MFE is providing the magnetic fields, in an electromagnetic motor, the rotor and stator are placed close to each other, without touching so that the magnetic fields are close enough to interact without contact or collision when either attracted to or repulsed from each other. Due to the interaction of the fields, a force is generated by the movement of the rotor with respect to the stator when the opposing (meaning facing opposite of each other) magnetic forces of the MFEs on the rotor and the MFEs on the stator attract or repel each other. Since the rotor is fixed to a rotational shaft, and the magnetic fields are aligned concentrically, the resultant force causes rotation of the shaft.

In further detail, the interaction between the magnetic fields of attraction and repulsion creates a series of push and pull forces emanating from the alternating polarities of the magnetic fields such that the rotor is forced to rotate. In this situation of pushing and pulling, the rotating MFEs experience a minor resistant "jump" movement when moving between adjacent fixed MFEs, which alternate in polarity. Although the rotating elements ultimately overcome the attractive force, thereby avoiding a stop of the rotational movement, there remains a minor disruption in the flow. However imperceptible the disruption might be to the naked eye, if this disruption is minimized or eliminated, a more efficient motor may be achieved.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

This disclosure is directed to an electromagnetic motor using interaction between a constant magnetic field from a series of permanent magnets (PMs) and an induced magnetic field from current passed through coiled wire (coils). As explained above, in some instances hereinafter, both types may be referred to as "magnetic field elements" or MFE(s).

Generally, it does not matter whether the PMs or the coils are held fixed in place on a stator, while the other is attached to the rotor to freely rotate about an axis of the rotor. Note, inasmuch as the PMs or the coils may be interchangeably placed, respectively, either on the stator or on the rotor, rather than having to distinguish whether the PMs or the coils are the discussion hereinafter refers to the PMs and the coils, collectively, as elements.

Illustrative Embodiments of a Motor/Generator Device

Figure 1:
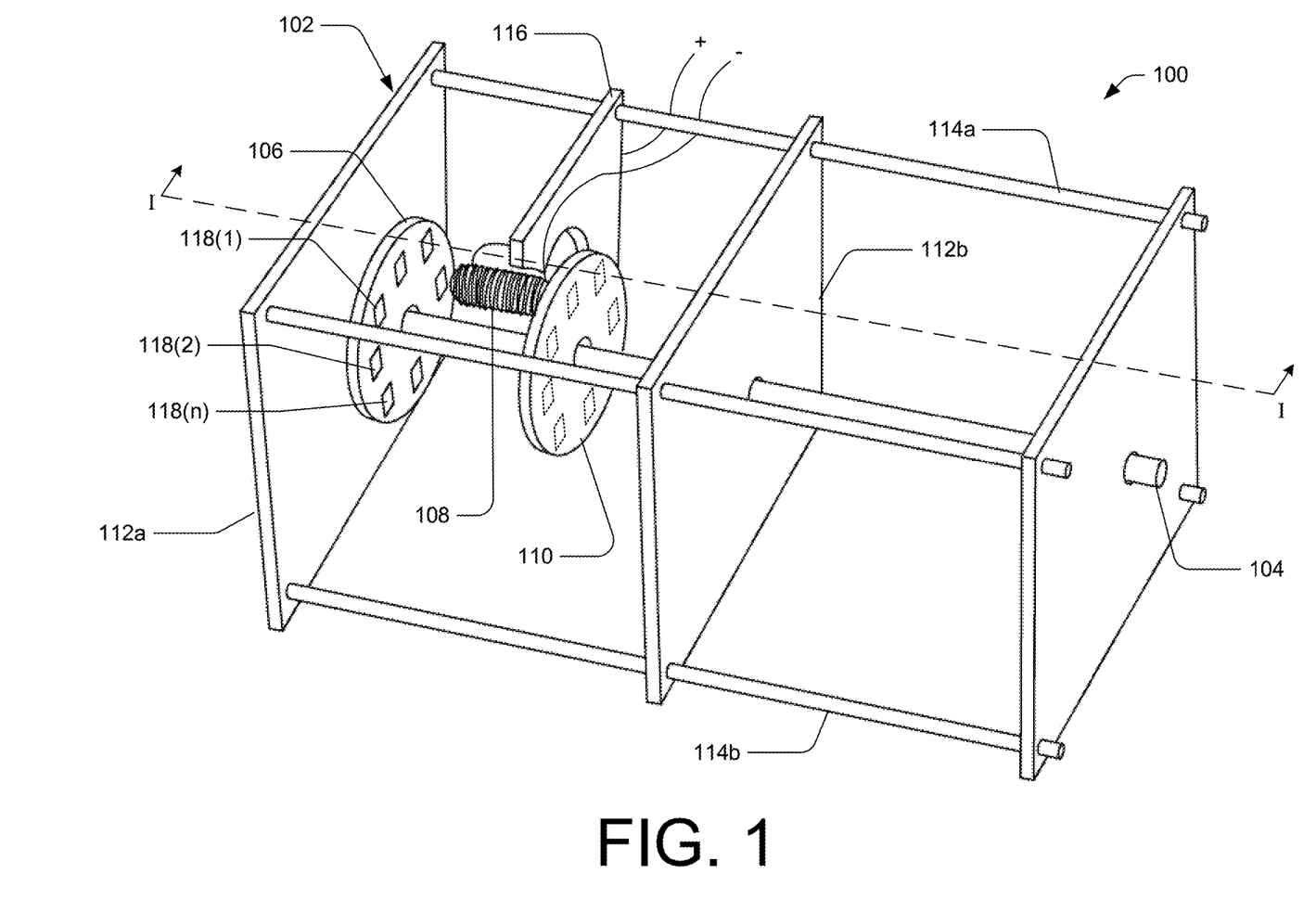
FIG. 1 illustrates a perspective view of an electromagnetic motor according to an embodiment of the instant disclosure.

FIG. 1 illustrates the perspective view of an electromagnetic motor/generator "device" 100 according to an embodiment of the instant disclosure. In an embodiment, device 100 may include a housing 102, a rotary shaft 104, a first rotor 106, and a coil of wire 108 (also known as an MFE, as discussed above). Further, an embodiment may include a second rotor 110.

Housing 102 may vary widely depending on the needs and uses of the motor. For example, housing 102 may include continuous surface siding like that of end pieces 112a, 112b, and/or may include skeletal frame members 114a, 114b. Housing 102 may further incorporate support members such as a coil support member 116 to hold coil 108 in position with first rotor 106 and second rotor 110, for example. In general, materials and structure used for a housing of a motor vary widely according to the circumstances in which the motor is implemented. As such, housing 102 may include one or more of metal, wood, plastic, composite materials, etc.

Rotary shaft 104 may include a variety of materials suited for the use of the device 100 as well. Rotary shaft 104 may be supported within housing 102 via standard ball bearing supports for reduced resistance. Rotary shaft 104 supports the rotational movement of the first rotor 106 and may further support the rotational movement of the second rotor 110 in a further embodiment, as shown in FIG. 1. Moreover, rotary shaft 104 extends beyond first rotor 106 and second rotor 110 so that the extended portion of rotary shaft 104 may be accessed according to conventional manners for work input or work output.

First rotor 106 is attached at a central axis thereof to rotary shaft 104 and rotational movement is supported. A plurality of permanent magnets ("PMs") 118(1), 118(2), . . . , 118(n) (also known as MFEs, as discussed above) are attached to first rotor 106. PMs 118(1), 118(2), . . . , 118(n) may be attached to first rotor 106 in many ways and positions. For example, PMs 118(1), 118(2), . . . , 118(n) may be embedded within first rotor 106, affixed to a side surface of first rotor 106, affixed to a perimeter of first rotor 106, etc. Moreover, PMs 118(1), 118(2), . . . , 118(n) may be secured to first rotor 106 via an adhesive, clips, compression fit slots, or any suitable fastener to ensure the PMs 118(1), 118(2), . . . , 118(n) do not come free during operation or the lifetime of the device 100. With respect to spatial arrangement, PMs 118(1), 118(2), . . . , 118(n) are positioned on first rotor 106 in a circular pattern (e.g., in a circle) around rotary shaft 104.

PMs 118(1), 118(2), . . . , 118(n) may be of any size or shape, or magnetic strength suitable for the implementation of a particular motor. In an embodiment, all PMs 118(1), 118(2), . . . , 118(n) are the same size and same shape, which may enhance consistency in performance of device 100.

Figure 2:
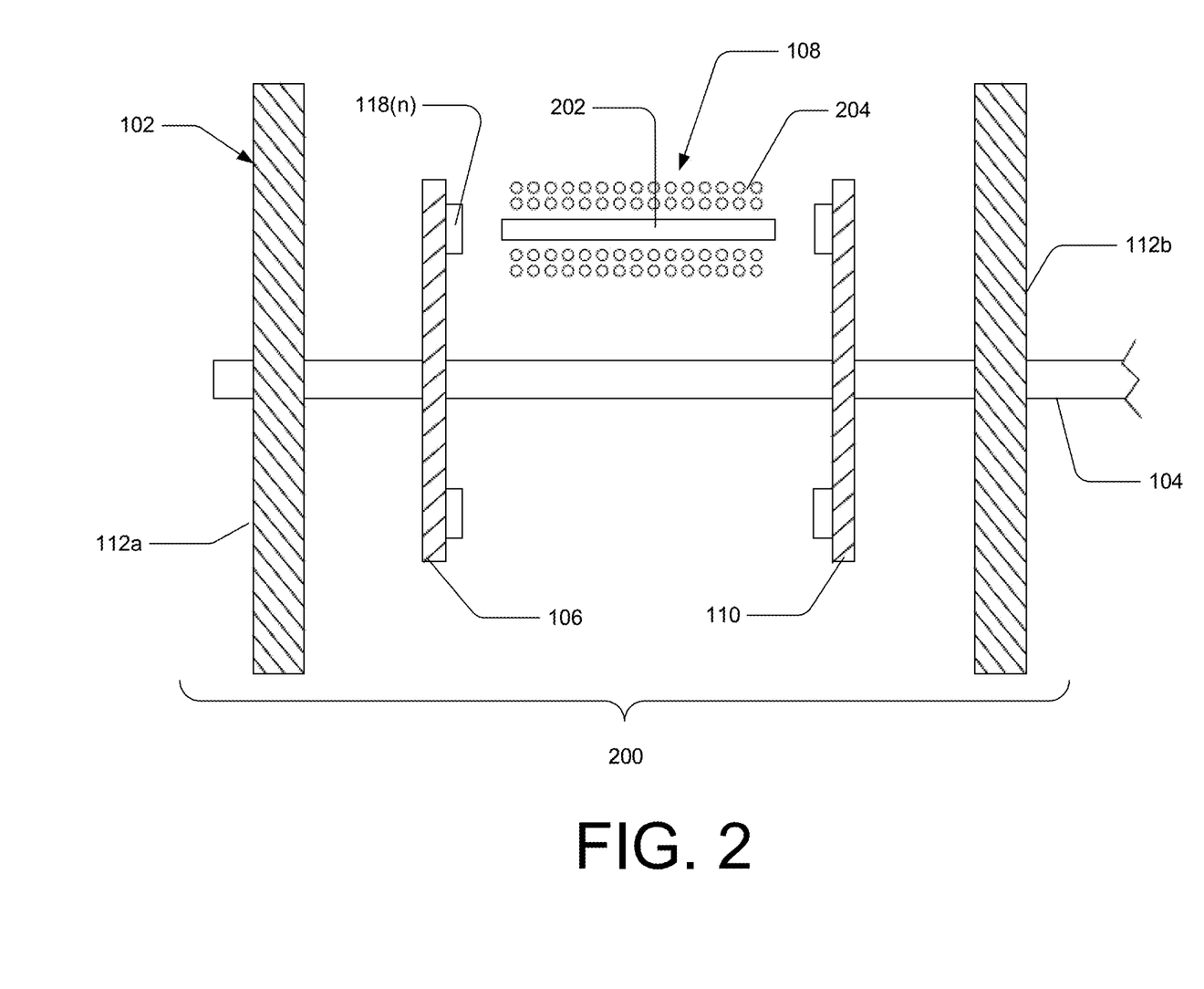
FIG. 2 illustrates a side, cross-sectional view of an electromagnetic motor according to an embodiment of the instant disclosure.

FIG. 2 depicts a cross-sectional view 200 of the device 100 from FIG. 1, as taken on a plane at line I-I. As seen in FIG. 2, coil 108 includes a core 202 wrapped multiple times with wire 204. Also as shown, coil 108 may be fixed, via coil support member 116, in a position in housing 102 such that an end of coil 108 is located adjacent to, but not touching PMs 118(1), 118(2), . . . , 118(n) on first rotor 106. Further, in an embodiment with second rotor 110, coil 108 may be sandwiched between first rotor 106 and second rotor 110 as shown, whereby the lengthwise direction of extension of coil 108 extends perpendicularly to the surface of first rotor 106 and second rotor 110. Coil 108 is held in place to position the ends thereof proximate to PMs on the respective rotors (106, 108).

Figure 3A:
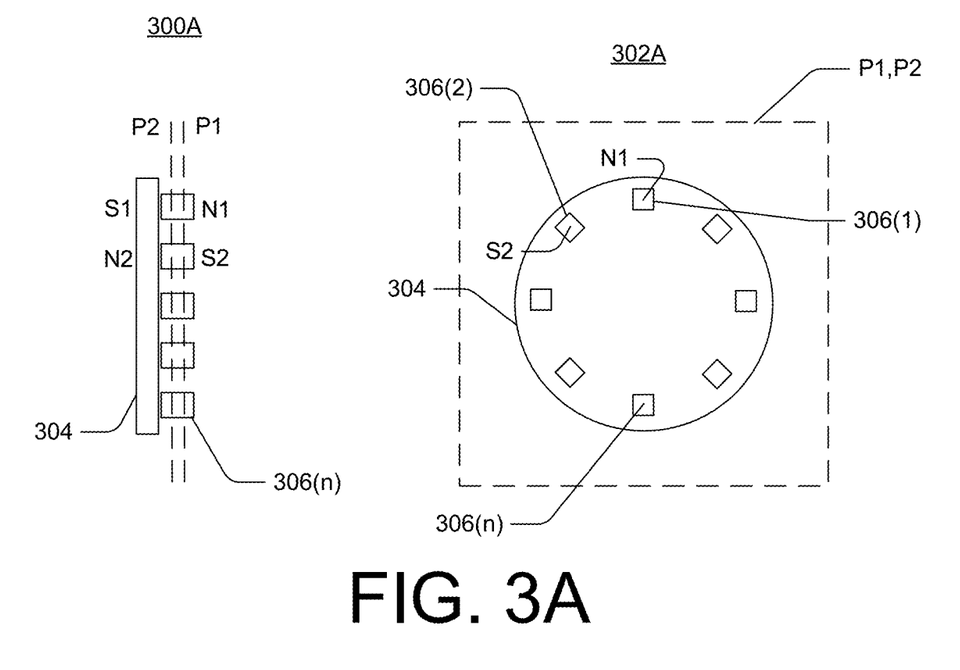
FIG. 3A illustrates a cross-sectional view and a planar view of an embodiment of a conventional rotor.

All PMs have a north pole and a south pole. However, various motor and generator configurations since the invention of the electromagnetic motor have typically oriented PMs therein in a similar manner, which is distinct from that of the instant disclosure, as explained hereafter. In FIG. 3A, as shown in the side cross-sectional view 300A and the planar view 302A of a rotor 304 from an example conventional electromagnetic motor, a first magnet 306(1) (i.e. of the plurality of magnets 306(1), 306(2), . . . , 306(n) on rotor 304) is oriented such that the north pole N1 of first magnet 306(1) is aligned with a first plane P1, and the south pole S1 of the same first magnet 306(1) is on a second distinct plane P2, which is parallel to P1. The adjacent magnet, second magnet 306(2), is flipped such that the south pole S2 of the second magnet 306(2) is aligned with the first plane P1, and the north pole N2 of the second magnet 306(2) is aligned with the second plane P2.

Figure 3B:
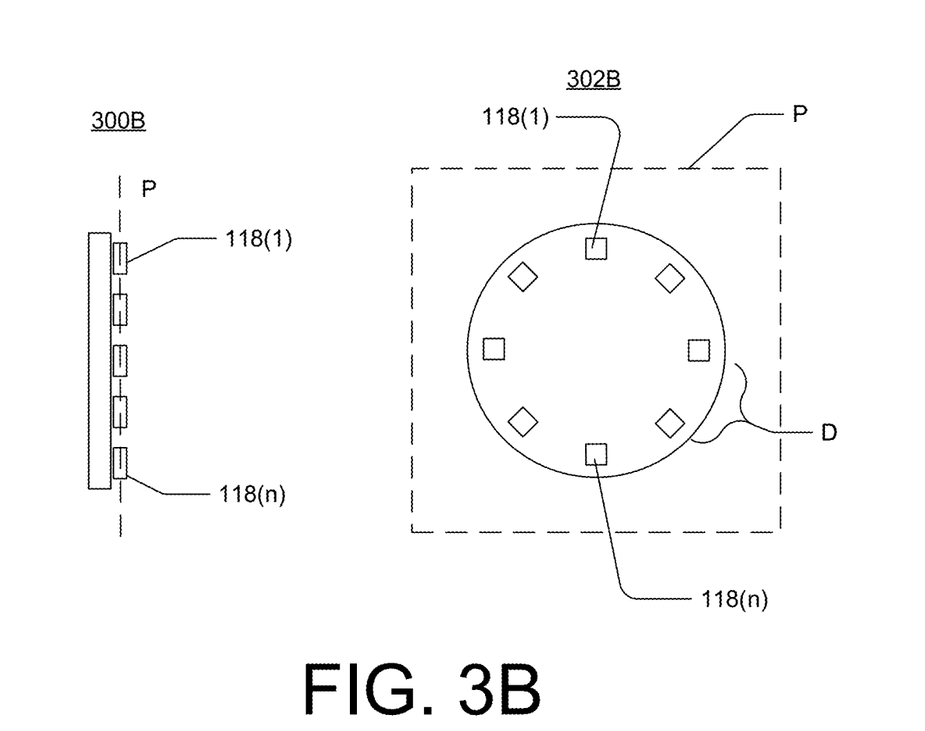
FIG. 3B illustrates a cross-sectional view and a planar view of a rotor according to an embodiment of the instant disclosure.

In contrast, in an embodiment according to this disclosure as shown in FIG. 3B, the side cross-sectional view 300B and the planar view 302B depicts PMs 118(1), 118(2), . . . , 118(n) as being oriented on first rotor 106 such that the respective north poles N and south poles S of every PM is aligned in the same plane P. Thus, all adjacent PMs, such as PM 118(1) and PM 118(2) are oriented on first rotor 106 in a same orientation. As shown, PMs 118(1), 118(2), . . . , 118(n) are oriented such that the respective north poles N are only adjacent a south pole S of the adjacent PMs—in the same plane P. As such, when first rotor 106 is rotated, there is a reduced resistance in movement between the adjacent PMs 118(1), 118(2), . . . , 118(n) on first rotor 106 when the PMs 118(1), 118(2), . . . , 118(n) cross the path of the induced electric field at the ends of coil 108.

That is, by orienting the PMs in a motor as disclosed herein, the resistant "jump" movement (discussed above with regard to conventional motors with conventional magnet orientation) may be minimized when moving between adjacent fixed MFEs, which alternate in polarity. As such, the motor/generator device of the instant disclosure may provide a more efficient and effective work and electricity output.

Figure 4:
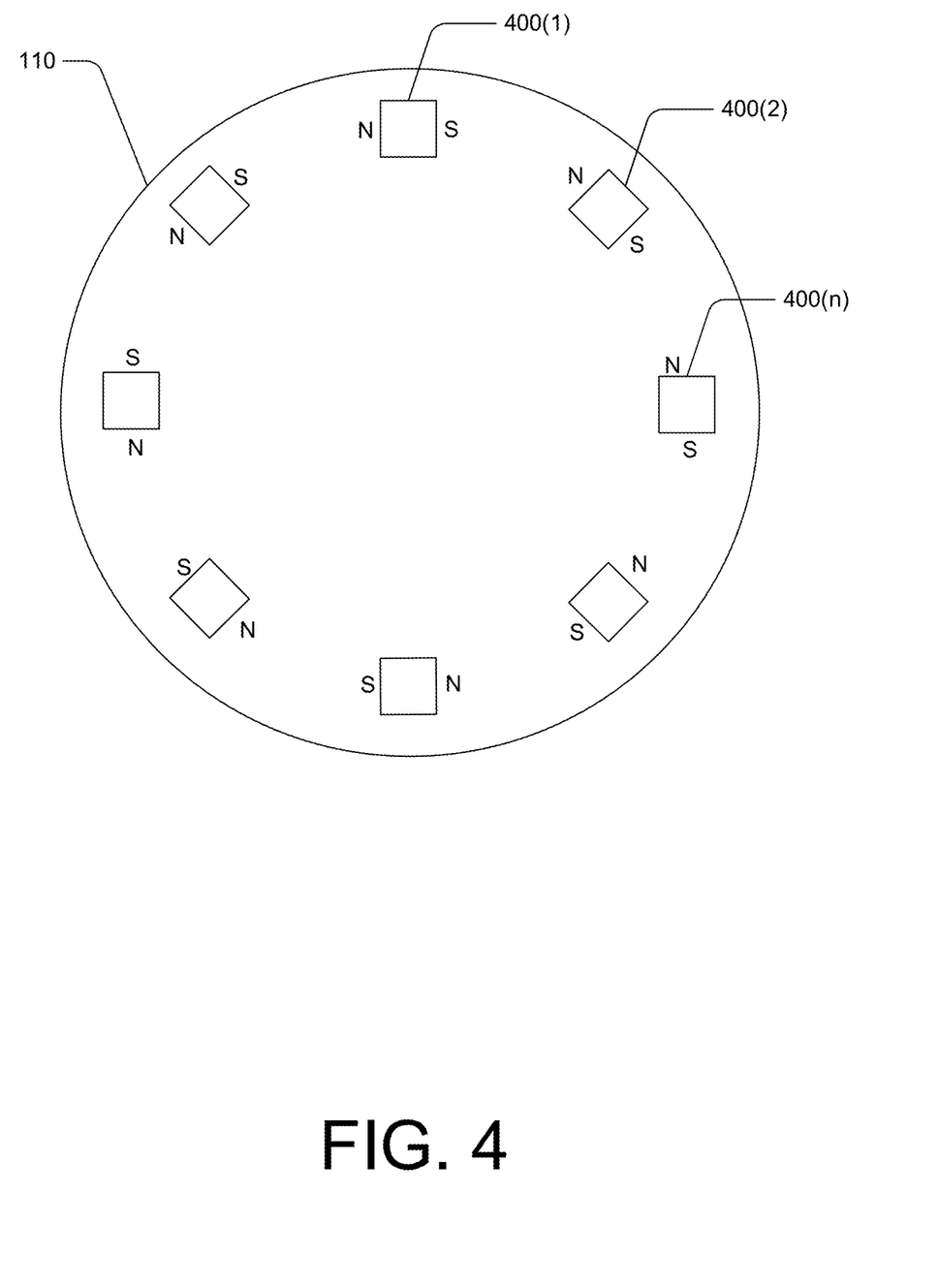
FIG. 4 illustrates a planar view of another rotor according to an embodiment of the instant disclosure.

In FIG. 4, a planar view of second rotor 110 is depicted. In an embodiment with first rotor 106 and second rotor 110, assuming first rotor 106 is constructed with PMs 118(1), 118(2), . . . , 118(n) as shown and described above, second rotor 110 includes PMs 400(1), 400(2), . . . , 400(n) that are oriented so as to have the respective north poles N and south poles S aligned in a same plane, either parallel or coplanar with second rotor 110. However, for second rotor 110, the respective north poles N and south poles S of PMs 400(1), 400(2), . . . , 400(n) are in a reverse direction with respect to the surface of second rotor 110 compared to that of first rotor 106. As such, when first rotor 106 and second rotor 110 rotate on rotary shaft 104, a north pole of a PMs on first rotor 106 will cross the first end of coil 108 at the same time as a south pole of a PMS on second rotor 110 will cross the second end of coil 108.

Additional factors that affect the effectiveness and efficiency of the device 100 may include the distance between adjacent PMs, orientation with respect to PMs on a second rotor (discussed below), and aspects related to the size and position of coil 108 (also discussed below). Note, while the gauge of the wire used to wrap around the core affects the width of the coil when considering a single turn (i.e., one wrap around the core), it is understood that a first wire that is half the thickness of a second wire will require two turns around the core to make a coil of the same width as a coil using one turn with the second wire. However, the gauge of the wire also affects the amount of current flow that can be run through the wire. As such, those skilled in the art will be able to determine what gauge should be used and the proper number of turns for the specific need of the motor or generator.

In an embodiment, the predetermined distance D (see FIG. 3B) between adjacent PMs may range from about 1 times the width of a magnet to 2 times the width of a magnet or more. For example, used as a motor, the motor may be more efficient when the predetermined distance D between PMs is not less than about the width as the PMs, but may be more. On the other hand, when used as a generator, the generator may be more efficient when the predetermined distance D between PMs is about twice (i.e., 2×) the width of the PMs. Note, depending on the frequency of the output desired from the motor, the predetermined distance may vary to be greater than twice (2×) the width of the PMs.

Coil 108 may include copper wire wrapped around an iron core (not shown). The iron core may be pure iron or a ferrite compound. In some instances, the thickness (or width) of coil 108 may vary and cause different efficiencies of the motor/generator device. For example, in an embodiment implemented for a motor, a width of coil 108 may be the same as or larger than the greatest dimensional distance across a surface of the PMs, where the PMs are substantially the same size. In an embodiment implemented for a generator, a width of the core (e.g., core 202 of coil 108, as seen in FIG. 2) may range from about ½ of the height of the PMs being used to about ⅝ of the height of the PMs being used, but may be not bigger than the height of the PMs being used. In another embodiment of a generator, width of coil 108 may vary, to adjust the output power, from being smaller than to bigger than the distance D between adjacent PMs.

Similarly, the length of coil 108 may affect the efficiency of the motor/generator device. For example, in an embodiment implemented for a motor, a length of coil 108 may be twice, or less than twice, the width of the PMs in a direction from pole to pole (which width may vary). In an embodiment, the length of coil 108 for a generator may be equal to or greater than the distance from the proximal lateral side of a first PM (e.g., the N pole side of PM 400(1) in FIG. 4) to the distal lateral side of an adjacent second PM (e.g., the S pole side of PM (400(2) in FIG. 4, which may further be achieved by combining two coils of equal length side by side and interconnecting them).

Figure 5:
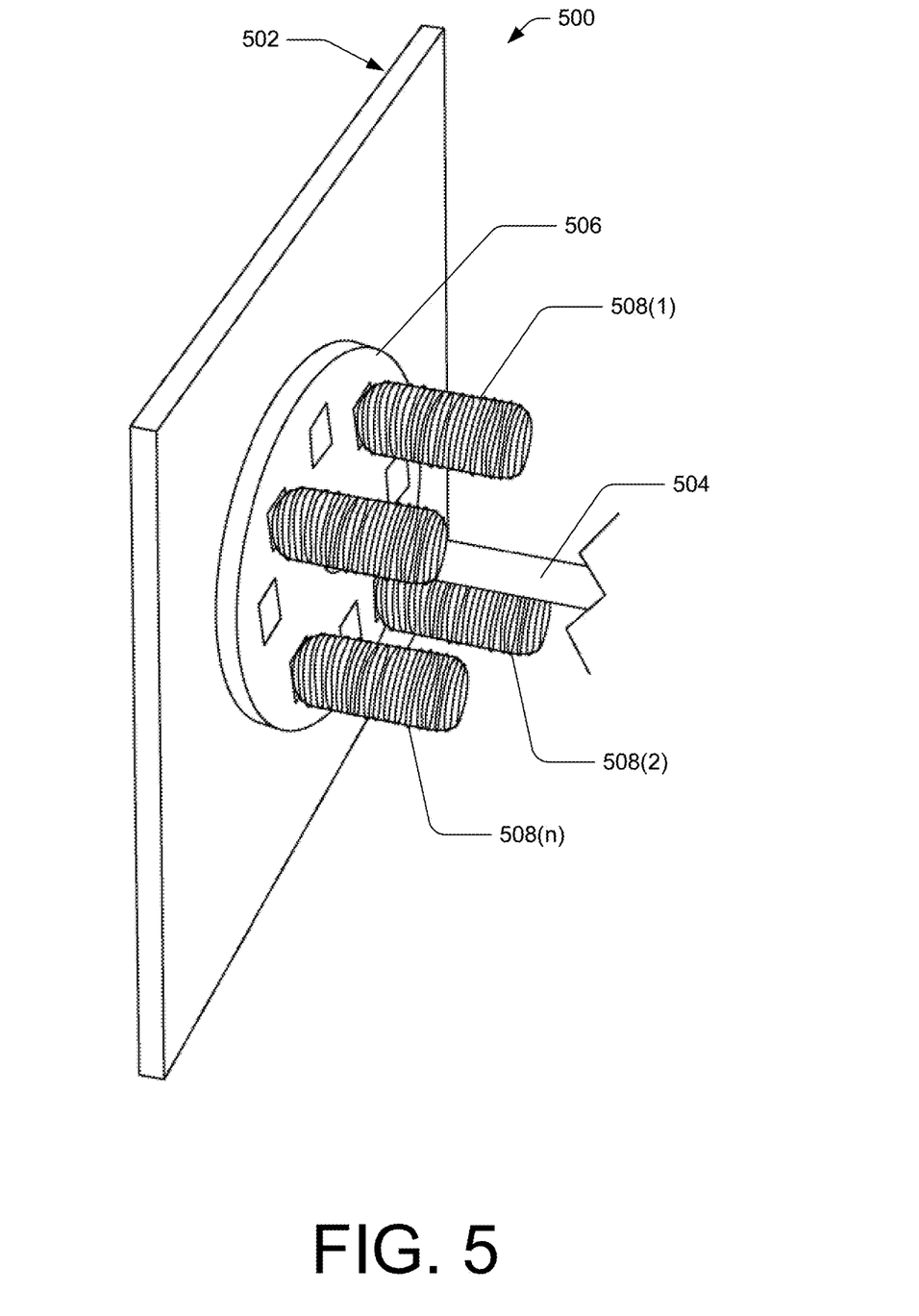
FIG. 5 illustrates a perspective view of another electromagnetic motor according to an embodiment of the instant disclosure.

FIG. 5 illustrates an additional or alternative embodiment of an electromagnetic motor 500 according to the instant disclosure. In an embodiment, motor 500 may include a housing 502, a rotary shaft 504, a first rotor 506, and a plurality of coils of wire 508(1), 508(2), 508(n) (where n is an integer indicating more coils are possible than those shown). A second rotor may be included, but for the sake of clarity, is not shown. In motor 500, the plurality of coils 508(1), 508(2), . . . , 508(n) may be held in place along the rotational line of the magnets, oriented as discussed regarding coil 108 above, and used to increase a work output in a motor embodiment, where power is supplied to each coil 508(1), 508(2), . . . , 508(n), or electricity output in a generator embodiment.

Figure 6:
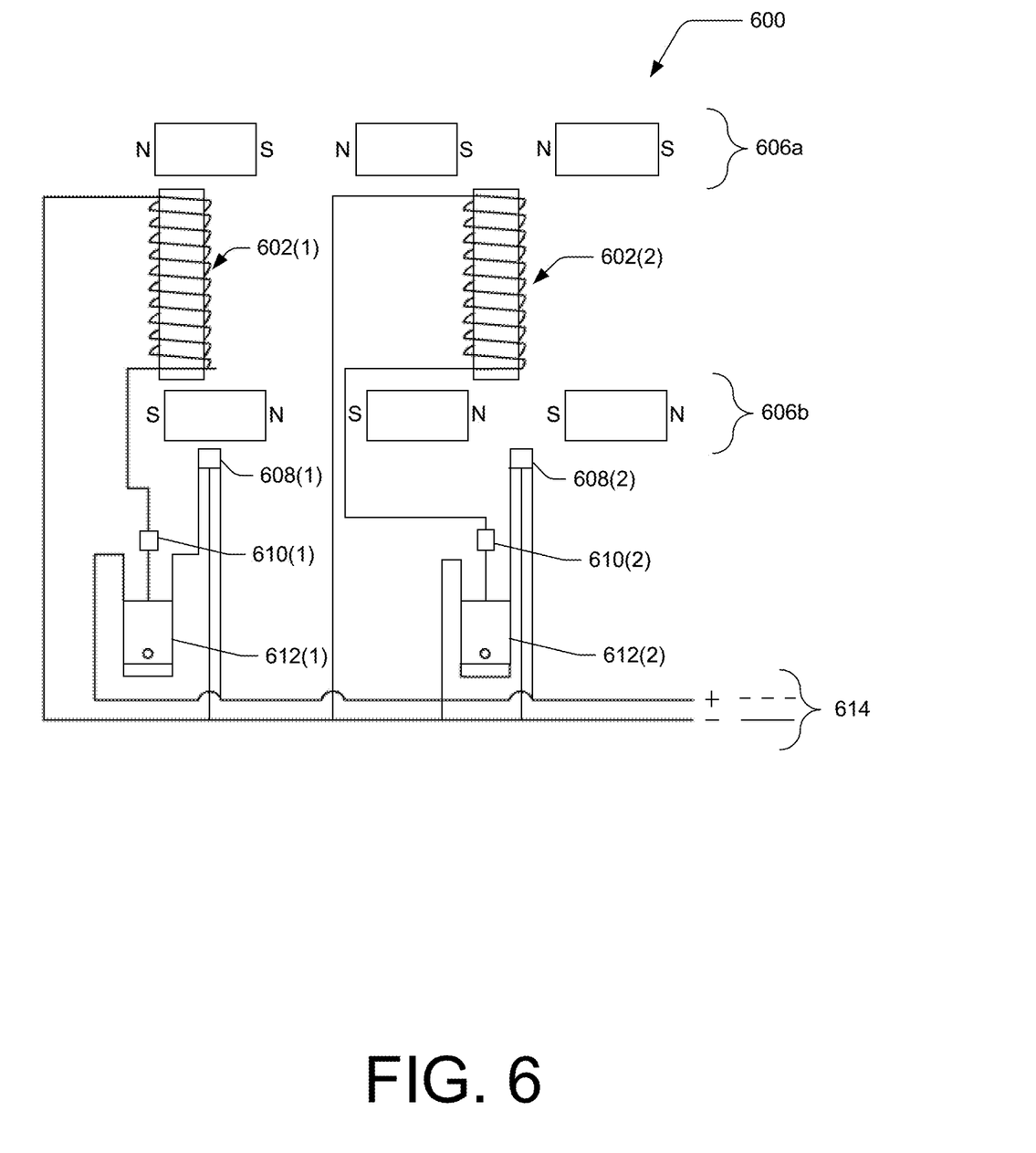
FIG. 6 illustrates a schematic view of an electromagnetic motor according to an embodiment of the instant disclosure.

FIG. 6 illustrates a schematic of a motor 600 according to an embodiment of this disclosure. Motor 600 may include coils on cores 602(1), 602(2) and magnets 604(1), 604(2), 604(3), 604(4), 604(5), 604(6), which are oriented with north and south poles N, S as shown, where magnets on a same rotor side 606a, 606b are aligned in a same plane as described above. Further, motor 600 may include hall effect sensors 608(1), 608(2), diodes 610(1), 610(2), and transistors 612(1), 612(2), electrically connected to coils on cores 602(1), 602(2), respectively. Further, wires at 614 may connect motor to a power source (not shown).

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A motor comprising:
a power input;
a coil of wire connected to the power input, the coil having a substantially cylindrical shape extending from a first end to a second end, the wire being wound in a spiral along a length direction of the coil from the first end to the second end, and a width direction of the coil being defined perpendicular to the length direction;
a rotor plate extending in a first plane, the rotor plate disposed with respect to the coil such that the length direction of the coil extends perpendicularly to the first plane and a side of the rotor plate is positioned proximate to the first end of the coil;
a shaft extending through the rotor plate coaxially with a central axis of the rotor plate and substantially parallel with the length direction of the coil; and
a plurality of magnets ("magnets") affixed on the side of the rotor plate and arranged in a circle, the magnets being affixed such that, upon rotation of the rotor plate, the magnets pass, successively, adjacent to the first end of the coil, and each of the magnets having respective north poles and corresponding respective south poles,
wherein each of the magnets is oriented, respectively, and circumferentially arranged on the rotor plate in a second plane in a circle such that a circumference of the circle along the second plane extends through each of the magnets from the north pole to the south pole thereof, the respective north poles and the respective south poles of each magnet being positioned an same radial distance from the central axis of the rotor plate, and the second plane being parallel to or coplanar with the first plane, and
wherein the plurality of magnets includes at least a first magnet, a second magnet, and a third magnet, oriented such that:
the second magnet is circumferentially positioned along the circle of the rotor plate to be adjacent a first side of the first magnet and the third magnet is circumferentially positioned along the circle of the rotor plate to be adjacent a second side of the first magnet, and
the north pole of the first magnet is spaced a predetermined distance from the south pole of the third magnet, and the south pole of the first magnet is spaced the predetermined distance from the north pole of the second magnet, and
all circumferentially adjacent magnets are separated circumferentially having an empty space therebetween.

2. The motor according to claim 1, wherein the rotor plate is a first rotor plate, and the magnets are a first plurality of magnets ("first magnets"),
wherein the motor further comprises:
a second rotor plate extending in a third plane that is substantially parallel to the first plane, the second rotor plate disposed with respect to the coil such that a side of the second rotor plate is positioned proximate to the second end of the coil; and
a second plurality of magnets ("second magnets") affixed on the side of the second rotor plate and arranged in a circle, the second magnets being affixed such that, upon rotation of the second rotor plate, the second magnets pass, successively, adjacent to the second end of the coil, and the second magnets having respective north poles and corresponding respective south poles,
wherein each of the second magnets is oriented, respectively, on the second rotor plate in a fourth plane such that the fourth plane extends through each of the second magnets from the north pole to the south pole thereof, the fourth plane being parallel to or coplanar with the third plane, and
wherein the second magnets include at least a fourth magnet, a fifth magnet, and a sixth magnet, which are further oriented such that:

the fifth magnet is laterally adjacent a first side of the fourth magnet and the sixth magnet is laterally adjacent a second side of the fourth magnet, and the north pole of the fourth magnet is spaced the predetermined distance from the south pole of the sixth magnet, and the south pole of the fourth magnet is spaced the predetermined distance from the north pole of the fifth magnet.

3. The motor according to claim 2, wherein the shaft secures the first rotor plate to the second rotor plate.

4. The motor according to claim 2, wherein the first rotor plate is oriented with respect to the second rotor plate such that, when the north pole of any of the first magnets is adjacent the first end of the coil, the south pole of any of the second magnets is adjacent the second end of the coil.

5. The motor according to claim 1, wherein the magnets are all substantially a same size and substantially a same shape.

6. The motor according to claim 5, wherein a magnet of the magnets has a width that is measured across the magnet in a direction extending parallel to the second plane, and wherein the predetermined distance is about twice the width of the magnet.

7. The motor according to claim 1, further comprising a coil support member to maintain the coil in a position adjacent the side of the rotor plate.

8. A motor comprising:
a frame structure;
a shaft extending through at least a portion of the frame structure;
a rotor connected to the shaft;
a coil of wire disposed such that an end of the coil is positioned adjacent a side of the rotor;
a power input connected to the coil; and
a plurality of magnets ("magnets") disposed in a circular pattern on the side of the rotor such that, upon rotation of the rotor, the magnets pass, successively, adjacent to the end of the coil, the magnets having respective north poles and corresponding respective south poles, wherein each of the magnets is oriented, respectively, and circumferentially arranged in a plane in a circle such that a circumference of the circle along the plane extends through each of the magnets from the north pole to the south pole thereof, the plane being parallel to or coplanar with the rotor, and wherein the magnets include at least a first magnet, a second magnet, and a third magnet, which are further oriented such that:
the second magnet is circumferentially positioned along the circle of the rotor plate to be adjacent a first side of the first magnet and the third magnet is circumferentially positioned along the circle of the rotor plate to be adjacent a second side of the first magnet,
the north pole of the first magnet is spaced a predetermined distance from the south pole of the third magnet, and the south pole of the first magnet is spaced the predetermined distance from the north pole of the second magnet and all circumferentially adjacent magnets are separated circumferentially having an empty space therebetween.

9. The motor according to claim 8, wherein the rotor is a first rotor, the plane is a first plane, and the magnets are a first plurality of magnets ("first magnets"), wherein the motor further comprises:
a second rotor connected to the shaft on an opposite end of the coil and disposed substantially parallel to the first rotor; and
a second plurality of magnets ("second magnets") disposed in a circular pattern on the side of the second rotor such that the second magnets pass, successively, adjacent to the opposite end of the coil, the second magnets having respective north poles and corresponding respective south poles, wherein each of the second magnets is oriented, respectively, on the second rotor in a second plane such that the second plane extends through each of the second magnets from the north pole to the south pole thereof, the second plane being parallel to or coplanar with the third plane, and wherein the second magnets include at least a fourth magnet, a fifth magnet, and a sixth magnet, which are further oriented such that:
the fifth magnet is laterally adjacent a first side of the fourth magnet and the sixth magnet is laterally adjacent a second side of the fourth magnet, and
the north pole of the fourth magnet is spaced the predetermined distance from the south pole of the sixth magnet, and the south pole of the fourth magnet is spaced the predetermined distance from the north pole of the fifth magnet.

10. The motor according to claim 9, wherein the shaft secures the first rotor to the second rotor.

11. The motor according to claim 9, wherein the first rotor is oriented with respect to the second rotor such that, when the north pole of any of the first magnets is adjacent the first end of the coil, the south pole of a correspondingly aligned second magnets is adjacent the second end of the coil.

12. The motor according to claim 8, wherein the magnets are all substantially a same size and substantially a same shape.

13. The motor according to claim 12, wherein a magnet of the magnets has a width that is measured across the magnet in a direction extending parallel to the same plane, and wherein the predetermined distance is about twice the width of the magnet.

14. The motor according to claim 8, further comprising a coil support member to maintain the coil in a position adjacent the side of the rotor.

15. A motor comprising:
a housing;
an elongated coil of wire secured within the housing;
one of a power input or a power output, connected to the coil;
a first rotor including magnets disposed and circumferentially arranged thereon in a circular pattern, the first rotor positioned so that the coil extends in a direction perpendicular to a surface of the first rotor;
a second rotor including magnets disposed and circumferentially arranged thereon in the circular pattern, the second rotor positioned so that the coil extends in a direction perpendicular to a surface of the second rotor, the second rotor disposed on a side of the coil opposite the first rotor so as to sandwich the coil therebetween;
a shaft extending through respective central axes of the first rotor and the second rotor, wherein the magnets on the first rotor are oriented in a circle such that a circumference of the circle extends so that the respective north poles and south poles lie alternating thereon in a first plane, wherein the magnets on the second rotor are oriented in a circle such that a circumference of the circle extends so that the respective north poles and south poles lie alternating thereon in a second plane, the first plane and the second plane being parallel to or coplanar with the first rotor and the second rotor, respectively, wherein any two circumferentially arranged adjacent magnets on the first rotor and any two adjacent magnets on the second rotor are positioned so that respective proximal ends of the two adjacent magnets differ in polarity and all circumferentially adjacent magnets are separated circumferentially having an empty space therebetween.

16. The motor according to claim 15, wherein the first rotor is oriented with respect to the second rotor such that, when the north pole of a magnet on the first rotor is adjacent the coil, the south pole of a magnet on the second rotor is adjacent the coil.

17. The motor according to claim 15, wherein the magnets are all substantially a same size and substantially a same shape.

18. The motor according to claim 15, wherein any two adjacent magnets on the first rotor and any two adjacent magnets on the second rotor are spaced a predetermined distance apart.

19. The motor according to claim 18, wherein a magnet of the magnets on the first rotor has a width that is measured across the magnet in a direction extending parallel to the first plane, wherein a magnet of the magnets on the second rotor has a width that is measured across the magnet in a direction extending parallel to the second plane, and wherein the width of the magnet of the magnets on the first rotor is equal to the width of the magnet of the magnets on the second rotor.

20. The motor according to claim 19, wherein the predetermined distance is about twice the width of the magnet of the magnets of the first rotor.

* * * * *